United States Patent [19]

Arakawa et al.

[11] Patent Number: 4,616,424
[45] Date of Patent: Oct. 14, 1986

[54] MAGNETIC DIRECTION SENSOR

[75] Inventors: Shunsuke Arakawa; Hiroya Suzuki, both of Saitama, Japan

[73] Assignee: Hitachi Metals, Ltd., Tokyo, Japan

[21] Appl. No.: 775,412

[22] Filed: Sep. 12, 1985

[30] Foreign Application Priority Data

Sep. 13, 1984 [JP] Japan .................................. 59-192355

[51] Int. Cl.$^4$ .............................................. G01C 17/30
[52] U.S. Cl. .................................... 33/361; 33/363 Q
[58] Field of Search ................. 33/363 Q, 361, 363 R, 33/355 R, 356

[56] References Cited

U.S. PATENT DOCUMENTS

| | | | |
|---|---|---|---|
| 2,519,058 | 8/1950 | Lundberg et al. | 33/356 |
| 3,959,889 | 6/1976 | Thomas | 33/363 R |
| 4,262,427 | 4/1981 | Lynch et al. | 33/356 |
| 4,413,424 | 11/1983 | Sasaki et al. | 33/363 Q |
| 4,445,279 | 5/1984 | Tsushima et al. | 33/363 Q |

FOREIGN PATENT DOCUMENTS 54-21889  2/1979  Japan .
56-143905 11/1981 Japan .
57-76411  5/1982  Japan .

OTHER PUBLICATIONS

IEEE Trans on Geoscience Electronics, vol. GE-7, No. 4, Oct. 1969.

*Primary Examiner*—Willis Little
*Attorney, Agent, or Firm*—Finnegan, Henderson, Farabow, Garrett & Dunner

[57] ABSTRACT

A magnetic direction sensor having a head constituted by a magnetic wound core composed of a ferromagnetic metal ribbon; a winding for exciting the magnetic wound core; a first output winding wound around the core such that it encircles two opposite portions of the core and a second output winding wound around the core at a certain angle with the first output winding such that it encircles two other opposite portions of the core; the first and second output windings providing output signals for determining the direction of the external magnetic field with respect to the head, and the inner and outer ends of the ribbon overlapping each other circumferentially by a certain angle $\theta$ may be between 0.5 and $\theta_{max}$ satisfying the equation: $\theta_{max} = \frac{1}{4}D + 1.5\alpha + 1$ wherein D represents the outer diameter of the core and $\theta$ represents a desired direction accuracy. This structure of the sensor head enables it to obtain a high direction accuracy.

6 Claims, 5 Drawing Figures

MAGNETIC DIRECTION SENSOR

BACKGROUND OF THE INVENTION

The present invention relates to a sensor for detecting the direction of a magnetic field. More specifically, it relates to a magnetic direction sensor adapted to detect the direction of a weak magnetic field such as a geomagnetism.

Recently, attempts have been made to provide a vehicle with apparatus for indicating the direction of the vehicle by detecting the direction of a geomagnetism, or with a system called trip computer which treats information including the vehicle's velocity, direction and place to give to a driver information concerning the distance to the destination, etc. In order for a vehicle to reach the destination without fail, exact detection of the direction of a magnetic field is critical.

Conventionally as direction sensors which detect the direction of geomagnetism, those using hole elements (see Japanese Patent Laid-Open No. 56-143905) and those comprising rotating magnetic cores (see Japanese Patent Laid-Open No. 57-76411) are known. However, the direction sensor using a hole element suffurs from a low sensitivity, and its characteristics are largely changeable due to moisture variation and large differences in characteristics from one hole element to another. Moreover, the direction sensor comprising the rotating magnetic core is complicated in mechanism, so it is not suitable for miniaturization, leaving it expensive. Therefore, these sensors have failed to find a wide commercial use.

To solve the problems of the above-mentioned conventional direction sensors, a so-called ring core-type magnetic direction sensor has recently been proposed. It comprises an annular magnetic core formed by winding a ferromagnetic metal ribbon, a winding for exciting the magnetic core, a pair of output windings each wound about the magnetic core such that it encircles the opposite portions of the magnetic core, the two output windings being arranged perpendicular to each other so that they provide output signals to determine the angle between the magnetic core and an external magnetic field. See Japanese Patent Laid-Open No. 54-21889 and IEEE Transaction on Geoscience Electronics, Vol. GE-7, No. 4, Oct. 1969, etc.

The magnetic direction sensor of this ring core type is relatively good in detection sensitivity. Its structure is simple and its detection head can be made compact. Further, its subsequent signal-treating circuit is relatively simple. As a result, the overall apparatus for detecting the direction of a magnetic field is expected to become compact and less expensive.

When the magnetic direction sensor was to be constructed by using a magnetic core formed by winding a ferromagnetic metal ribbon, it was conventionally considered that every part of the magnetic core should have as uniform a cross section as possible to ensure that every part of the magnetic core is subjected to the same magnetic flux $\phi$. Specifically speaking, when the metal ribbon was wound in a toroidal shape, both inner and outer ends of the metal ribbon were arranged essentially along the same radius of the core. In other words, they were terminated circumferentially at the same position. Further, since the same positioning of both ends of the metal ribbon is not always achieved in an industrial mass production, attempts were made to use an extremely thin ferromagnetic metal ribbon to ensure a minimum change of the cross section of the resulting magnetic core.

Nevertheless, such direction sensors are not necessarily satisfactory with respect to a detection accuracy, which has been a big obstacle to the commercial use of such sensors.

Furthermore, a magnetic direction sensor head having the magnetic core constructed by permalloy ribbon has magnetic characteristics which are likely to change under the influence of vibration, external force, etc. because permalloy's magnetic characteristics are generally highly affected by deformation. This seems to make it further difficult to pinpoint the exact causes of poor accuracy in detecting the direction of a magnetic field.

OBJECT AND SUMMARY OF THE INVENTION

An object of the present invention is, therefore, to provide a magnetic direction sensor having a high direction accuracy which could not be achieved conventionally.

In view of this object, we have carried out intensive study on the relationships between the structure of a detection head and the direction accuracy. As a result, we have found that in a magnetic direction sensor comprising a magnetic wound core of a ferromagnetic metal ribbon, higher accuracy is achieved by circumferentially overlapping in part the inner and outer ends of the ferromagnetic metal ribbon to intentionally increase the cross section of the overlapping end portions, rather than by keeping a cross section in every part of the magnetic core uniform. It is our understanding that in order to improve a direction accuracy, attention should be paid to the magnetic flux leaking at both ends of the core-forming ribbon rather than to the uniformity in a cross section of the magnetic core; In other words, it is necessary to keep permeability and reluctance equal in every part of the magnetic core. The present invention is based on such findings.

Namely, a magnetic direction sensor according to the present invention has a head comprising a magnetic wound core composed of a ferromagnetic metal ribbon; a winding for exciting the magnetic wound core; a first output winding wound around the core such that it encircles two opposite portions of the core; and a second output winding wound around the core at a certain angle with the first output winding such that it encircles two other opposite portions of the core; the first and second output windings providing output signals for determining the direction of an external magnetic field with respect to the head, characterized in that the inner and outer ends of the ribbon overlap each other circumferentially by an angle of $0.5 - \theta_{max}$ satisfying the equation: $\theta_{max} = \frac{1}{4}D + 1.5\alpha + 1$ wherein D represents the outer diameter of the core and $\alpha$ represents a desired direction accuracy.

DESCRIPTION OF THE PREFERRED EMBODIMENTS

Figure 1:
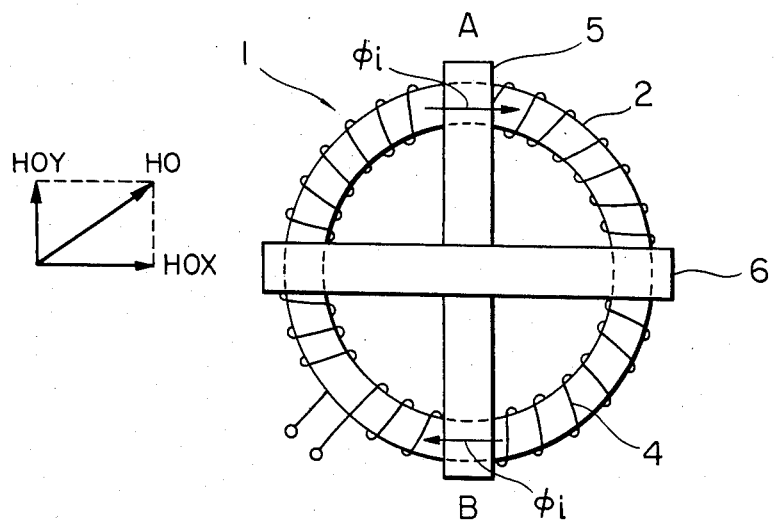
FIG. 1 is a schematic view showing a detection head in the magnetic direction sensor according to the present invention.
Figure 2:
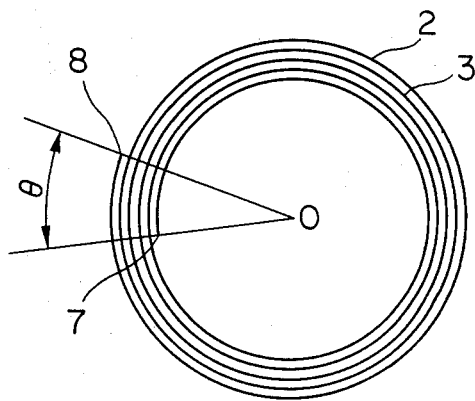
FIG. 2 is a schematic cross-sectional view of the magnetic wound core.

Referring to FIGS. 1 and 2, the magnetic direction sensor according to one embodiment of the present invention has a detection head shown by the reference number 1. The head 1 is composed of an annular wound core 2 formed by winding a ferrowagnetic metal ribbon 3, a winding 4 wound around the core 2 for magnetically exciting it, and a pair of output windings 5 and 6 each wound around the core 2 such that it encircles two opposite portions of the core 2. The output windings 5, 6 are arranged along the diameters of the core 2 which are perpendicular to each other. It is our invention's feature that the inner end 7 of the ribbon 3 overlaps the outer end 8 of the ribbon 3 circumferentially by an angle "$\theta$". This angle is defined herein as "circumferential angle."

The function of this detection head 1 will be described hereinafter.

When the exciting winding 4 is energized by a pulse sent from a pulse generator (not shown), an alternate magnetic field is generated in the magnetic wound core 2 synchronously to the pulse. Take the output winding 5 for instance, a magnetic flux $\phi_i$ penetrates both opposite sides A, B of the winding 5. Since the magnetic flux $\phi_i$ is uniform throughout the core 2 and the portions A and B are diametrically opposite to each other, the magnetic fluxes at A and B are offsetting each other. Thus, when there is no external magnetic field, no electric current is induced in the winding 5. And when there is an external magnetic field $H_o$, its component $H_{ox}$ perpendicular to a plane defined by the winding 5 affects magnetic fluxes at A and B. Specifically, the magnetic fields $H_A$, $H_B$ at A, B are as follows:

$$H_A = H_{ox} + H_i \quad (1)$$

$$H_B = H_{ox} - H_i$$

wherein $H_i$ represents a magnetic field corresponding to the magnetic flux $\phi_i$.

The above equations (1) result in the equations of magnetic flux as follows:

$$\phi_A = F(H_{ox} + H_i) \quad (2)$$

$$\phi_B = F(H_{ox} - H_i)$$

Since the output winding 5 is subjected to the total magnetic flux $\phi_A + \phi_B$, an electric voltage Vx is induced therein. That voltage Vx is in proportion to the X-component of external magnetic field $H_{ox}$. The same is true of the output winding 6 perpendicular to the winding 5. Thus, the output voltage Vy of the output winding 6 is in proportion to the Y-component of external magnetic field Hoy. The output voltages Vx and Vy are combined to produce a signal indicating the direction of the magnetic field $H_o$ with respect to the head.

In the present invention, it is an indispensable requirement that the inner and outer ends of the ribbon constituting the magnetic wound core are overlapping circumferentially by an angle $\theta$ which is in general 0.5°–15°. Without satisfying the above requirement, high accuracy in determining the direction of a magnetic field cannot be achieved. Within the above range, the smaller the circumferential angle, the higher the direction accuracy.

The direction accuracy also depends on how large the outer diameter of the magnetic wound core is. Specifically, in order to achieve the direction accuracy of within ±1°, the circumferential angle $\theta$ is in the range of about 0.5°–15° for a magnetic core of a 50-mm outer diameter, about 1°–10° for a 30-mm outer diameter and about 2°–7° for a 20-mm outer diamter.

With respect to ribbon materials, permalloys, such as 78% Ni-Fe permalloy may be used. Though the permally materials are less expensive, they are disadvantageous in that their magnetic characteristics are easily affected by deformation. Accordingly, sufficient attention should be paid to prevent the deformation which may be introduced by vibration of a vehicle body, thermal deformation of parts supporting the magnetic core, etc.

On the other hand, amorphous, magnetic metals recently developed and gathering attention, particularly Co-base amorphous alloys having a small magnetostriction are highly suitable for the purpose of the present invention because their magnetic characteristics are extremely less affected by deformation.

Further, the magnetic core is usually in a ring shape, but it may be in a polygonal shape with even number of sides.

The influence of the circumferential angle $\theta$ on direction accuracy in the detection of the direction of the magnetic field $H_o$ with respect to the head will be further explained by means of the following Examples.

EXAMPLE 1

Using a single roll-type quenching apparatus, an amorphous alloy ribbon of 3 mm in width and 20 μm in thickness was prepared. The alloy composition was $Co_{70.0} Fe_{1.5} Mn_{5.0} Si_{13.0} B_{8.5} M_{2.0}$ (numbers represent atomic %). This ribbon was wound around a bobbin of 20 mm in diameter 50 times, and the circumferential angle $\theta$ between the inner and outer ends of the ribbon was set at various levels ranging from −2° to +22°. The resulting magnetic cores were kept at 400° C. for four hours, subjected to a stress-relieving treatment and then cooled with water. Each of these cores was provided with 100 turns of an exciting winding and then with two 100-turn output windings perpendicular to each other. With the detection heads thus assembled, measurements were carried out with respect to the directions of east, west, south and north. The relationship between the circumferential angles $\theta$ and the direction errors was obtained as shown by FIG. 3.

Figure 3:
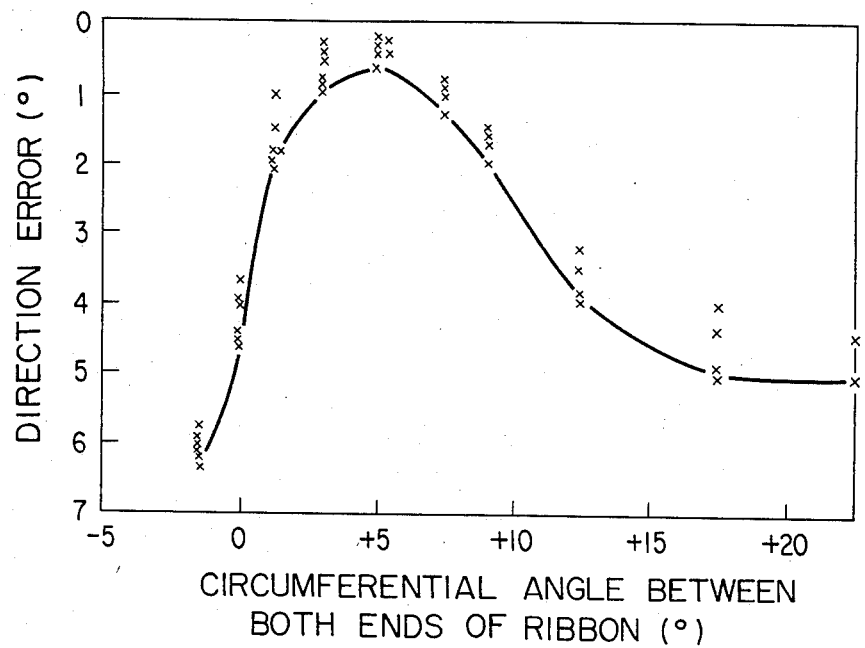
FIGS. 3 and 4 are graphs each showing the relationship between direction errors and the circumferential angle of the overlapping end portions of the ribbon constituting the magnetic wound core.

As is apparent from FIG. 3, the circumferential angle $\theta$ should be within about 1°–about 9° to achieve the direction accuracy within ±2°. Further, to achieve the direction accuracy within ±1°, the circumferential angle $\theta$ should be 3°–7°.

EXAMPLE 2

Figure 4:
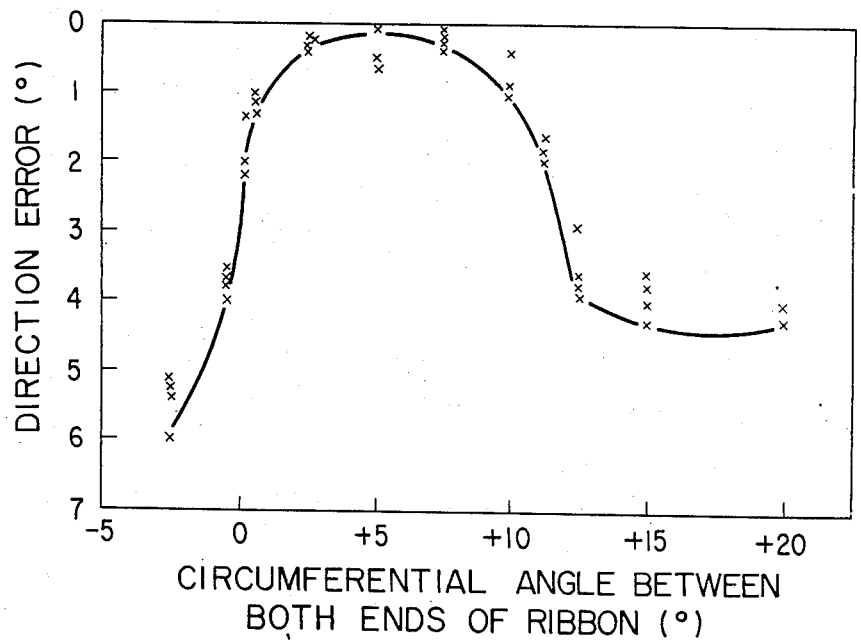

The same ribbon as in Example 1 was used to form a magnetic wound core around a 30-mm-diameter bobbin. The magnetic core was heat-treated and provided with an exciting winding and a pair of output windings in the same manner as in Example 1. Similarly, direction errors were measured with the circumferential angle $\theta$ ranging from −2.5° to ±20°. The results are shown in FIG. 4. As is clear from FIG. 4, the circumferential angle $\theta$ of about 0.5°–about 11° is needed to achieve the direction accuracy within ±2°. When $\theta$ is about 1°–about 10°, the direction error $\theta$ is as small as ±1° or less.

EXAMPLE 3

Detection heads of various diameters ranging from 10 mm to 50 mm were manufactured in the same way as in Example 1. For each detection head, measurements were made to determine the range of circumferential angle $\theta$ in which the direction error was ±1° or less, ±2° or less and ±4° or less, respectively. Thus, the relationships between the circumferential angle $\theta$, the direction error and outer diameter of the wound cores were obtained as shown in FIG. 5.

Figure 5:
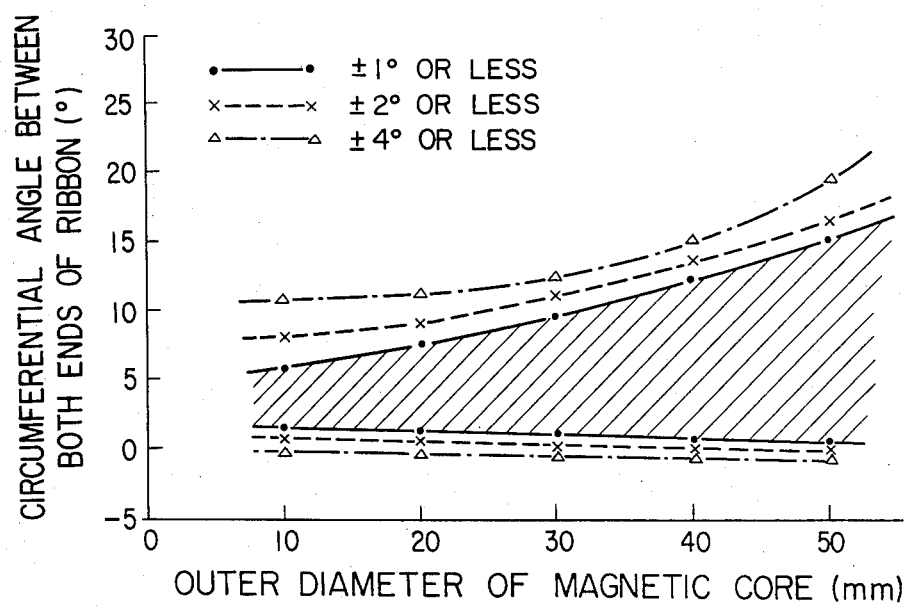
FIG. 5 is a graph showing the relationships between the outer diameter of the magnetic wound core, the circumferential angle of the overlapping ribbon portions and the direction errors.

FIG. 5 shows, for instance, the circumferential angle $\theta$ of 2°–6° which provides the direction accuracy of ±1° or less for a 10-mm-diameter core. It is also shown that when the core is 50 mm in diameter, the circumferential angle $\theta$ is 0.5°–15° for satisfying the direction accuracy of ±1° or less. It is observed that the larger the magnetic core's diameter, the wider the circumferential angle range which ensures a direction accuracy at the desired level.

Further, it is appreciated that as far as the direction accurary of about ±1° or less is concerned, the upper limit of the circumferential angle $\theta_{max}$ necessary to provide the above accuracy varies depending on the outer diameter D of the core as shown by the following equation:

$$\theta_{max} \leq \tfrac{1}{4}D + 2.5$$

Further, to achieve the direction accuracy within about ±2°, $\theta_{max}$ should meet the following equation:
$\theta_{max} \leq \tfrac{1}{4}D + 4$
Thus, where the direction accuracy is within ±$\alpha$°, $\theta_{max}$ is expressed generally as follows:

$$\theta_{max} \leq \tfrac{1}{4}D + 1.5\alpha + 1$$

EXAMPLE 4

The magnetic wound cores were prepared in the same way as in Example 1 except for using ribbons of 20 μm in thickness and 1.5 mm, 3 mm, 5 mm and 7 mm in width. As a result of direction error measurements, it was found that the direction accuracy was not affected by ribbon width. It was also observed that the wider the ribbon constituting the magnetic core, the larger an output signal.

EXAMPLE 5

The same procedure as in Example 1 was followed except for using ribbons of 15 μm, 20 μm, 30 μm and 40 μm in thickness. These ribbons were wound 67, 50, 33 and 25 turns, respectively. The measurement of direction errors revealed that the direction accuracy was not affected by ribbon thickness.

As mentioned above, the present invention provides a magnetic direction sensor having a high direction accuracy. What is necessary to achieve such a high direction accuracy is only to provide the circumferential angle $\theta$ between the inner and outer ends of the ribbon which is 0.5°–15°. Accordingly, there is no need for using an extremely thin metal ribbon, and conventional amorphous ribbons of about 30 μm–about 40 μm which are usually obtained by a roll-quenching process may be used to manufacture a magnetic direction sensor head with a high direction accuracy.

Also, since the sensor of the present invention is very simple in structure, it may be made compact and so can easily find a space in a vehicle where it is mounted.

What is claimed is:

1. A magnetic direction sensor having a head comprising:
   (a) a magnetic wound core composed of a ferromagnetic metal ribbon;
   (b) a winding for exciting said magnetic wound core;
   (c) a first output winding wound around said core such that it encircles two opposite portions of said core; and
   (d) a second output winding wound around said core at a certain angle with said first output winding such that it encircles two other opposite portions of said core; said first and second output windings providing output signals for determining the direction of an external magnetic field with respect to the head;
   characterized in that the inner and outer ends of said ribbon overlap each other circumferentially by an angle between 0.5 and $\theta_{max}$ satisfying the equation: $\theta_{max} = \tfrac{1}{4}D + 1.5\alpha + 1$ wherein D represents the outer diameter of said core, and $\theta$ represents a desired direction accuracy.

2. The magnetic direction sensor according to claim 1, wherein said ferromagnetic metal ribbon has substantially amorphous structure.

3. The magnetic direction sensor according to claim 1, wherein said first and second output windings are perpendicular to each other.

4. The magnetic direction sensor according to claim 1, wherein the angle between said inner and outer ends of said ribbon is 0.5°–15°.

5. The magnetic direction sensor according to claim 1, wherein the angle between said inner and outer ends of said ribbon is 1°–10°.

6. The magnetic direction sensor according to claim 1, wherein the outer diameter of said magnetic wound core is 10 mm–50 mm.

* * * * *